(12) United States Patent
Cantelli et al.

(10) Patent No.: US 8,999,136 B2
(45) Date of Patent: Apr. 7, 2015

(54) METHOD FOR COMPENSATING A WEAR OF AN ELECTRODE

(75) Inventors: Ugo Cantelli, Florence (IT); Garth M Nelson, Ballston Lake, NY (US); Yuanfeng Luo, Shanghai (CN); Yimin Zhan, Shanghai (CN); Roberto Ciappi, Florence (IT); Massimo Arcioni, Florence (IT); Renwei Yuan, Shanghai (CN)

(73) Assignee: Nuovo Pignone S.p.A., Florence (IT)

( * ) Notice: Subject to any disclaimer, the term of this patent is extended or adjusted under 35 U.S.C. 154(b) by 73 days.

(21) Appl. No.: 13/503,290

(22) PCT Filed: Sep. 14, 2010

(86) PCT No.: PCT/US2010/048691
§ 371 (c)(1),
(2), (4) Date: Jun. 14, 2012

(87) PCT Pub. No.: WO2011/049686
PCT Pub. Date: Apr. 28, 2011

(65) Prior Publication Data
US 2012/0240386 A1  Sep. 27, 2012

(30) Foreign Application Priority Data
Oct. 21, 2009  (IT) ............................. CO2009A0042

(51) Int. Cl.
*B23H 9/10* (2006.01)
*B23H 3/00* (2006.01)
*G05B 19/404* (2006.01)
(Continued)

(52) U.S. Cl.
CPC ................ *G05B 19/404* (2013.01); *B23H 7/20* (2013.01); *B23H 9/00* (2013.01); *B23H 9/10* (2013.01); *G05B 2219/45221* (2013.01); *G05B 2219/50308* (2013.01); *G05B 2219/50321* (2013.01)

(58) Field of Classification Search
USPC .............. 29/23.51, 889.23; 219/69.11–69.17, 219/121.71; 415/90; 416/223 A; 205/651, 205/686
See application file for complete search history.

(56) References Cited

U.S. PATENT DOCUMENTS

| 4,725,705 A | 2/1988 | Holland-Moritz et al. |
| 5,354,961 A | 10/1994 | Diot et al. |

(Continued)

FOREIGN PATENT DOCUMENTS

| CN | 1496773 A | 5/2004 |
| CN | 1572404 A | 2/2005 |

(Continued)

OTHER PUBLICATIONS

International Search Report and Written Opinion from corresponding PCTUS2010/48691 dated Dec. 7, 2010.
(Continued)

*Primary Examiner* — Minh Trinh
(74) *Attorney, Agent, or Firm* — GE Global Patent Operation

(57) ABSTRACT

A Method and machine tool for compensating a wear of an electrode that machines a workpiece. The method includes selecting a current pocket from plural pockets of the workpiece; updating a wear compensation to be applied to the electrode for the current pocket based on wear compensation of a previous pocket, where the previous pocket is adjacent to the current pocket; and applying the updated wear compensation to the electrode for machining the current pocket.

11 Claims, 11 Drawing Sheets

(51) Int. Cl.
*B23H 7/20* (2006.01)
*B23H 9/00* (2006.01)

(56) References Cited

U.S. PATENT DOCUMENTS

| | | | |
|---|---|---|---|
| 5,851,104 | A | 12/1998 | Dakin et al. |
| 5,919,380 | A | 7/1999 | Magara et al. |
| 5,923,560 | A | 7/1999 | Ozaki et al. |
| 6,562,227 | B2 | 5/2003 | Lamphere et al. |
| 6,921,876 | B2 | 7/2005 | Okuda et al. |
| 6,998,561 | B2 | 2/2006 | Kato et al. |
| 7,168,896 | B2 * | 1/2007 | Koskinen et al. ............ 409/140 |
| 7,301,116 | B2 * | 11/2007 | Chen et al. ................ 219/69.16 |
| 6,787,728 | B2 | 8/2008 | Das et al. |
| 8,236,162 | B2 * | 8/2012 | Zhan et al. .................... 205/651 |
| 2002/0162824 | A1 | 11/2002 | Tricarico et al. |
| 2005/0247569 | A1 | 11/2005 | Lamphere et al. |
| 2006/0138092 | A1 | 6/2006 | Chen et al. |
| 2007/0029287 | A1 | 2/2007 | Cantelli et al. |
| 2007/0166149 | A1 | 7/2007 | Tacconelli et al. |
| 2008/0135418 | A1 | 6/2008 | Yuan |
| 2008/0173618 | A1 | 7/2008 | Chen et al. |

FOREIGN PATENT DOCUMENTS

| | | |
|---|---|---|
| EP | 0406918 A2 | 1/1991 |
| EP | 0555818 A1 | 8/1993 |
| EP | 1211009 A1 | 6/2002 |
| EP | 1238740 A1 | 9/2002 |
| EP | 1433558 A2 | 6/2004 |
| JP | 2983436 B2 | 11/1999 |
| TW | 520311 B | 2/2003 |

OTHER PUBLICATIONS

Italian Search Report from corresponding IT CO20090042 dated Jul. 6, 2010.
CN Office Action dated Sep. 26, 2013 from corresponding on Application No. 201080049059.X, along with unofficial English translation.

* cited by examiner

METHOD FOR COMPENSATING A WEAR OF AN ELECTRODE

CROSS-REFERENCE TO RELATED APPLICATIONS

This is a national stage application filed under 35 U.S.C. §371(c) of prior-filed, co-pending PCT patent application serial number PCT/US2010/048691, filed on Sep. 14, 2010 which claims priority to Italian Patent Application Serial No. CO2009A000042, filed on Oct. 21, 2009, the entire contents of which are incorporated herein by reference.

BACKGROUND OF THE INVENTION

1. Field of the Invention

Embodiments of the subject matter disclosed herein generally relate to methods and systems and, more particularly, to mechanisms and techniques for compensating a path of a tool used to manufacture a workpiece.

2. Description of the Related Art

Modern centrifugal compressors include multiple stages of impellers mounted axially along a supporting rotor. The centrifugal compressor stage (impeller) may include many blades. The blades in each stage or row are identical to each other, and typically vary in size and shape from stage to stage. FIG. 1 shows a two-dimensional (2D) impeller 10 of a compressor, the impeller having blades 12. FIG. 2 shows another two-dimensional impeller 10 having blades 12 covered by a cover 13. FIGS. 3 and 4 shows three-dimensional (3D) impellers 14 having blades 16. The impeller in FIG. 4 has a shroud 18 covering the blades. The shape of the blades determines whether the impeller is 2D or 3D.

In this regard, it is noted that for a 2D impeller as shown in FIGS. 1 and 2, the machining tool that forms the blades needs to move only up and down (along a Z direction) relative to the blades and also in a plane (XY plane) perpendicular to the Z direction in order to be able to form the blades. This type of movement is called 3 axial machining.

However, for a more complex design as the 3D impeller shown in FIGS. 3 and 4, the machining tool needs to move in more directions, as will be discussed later. This is the case as the shroud 18 is not attached to the impeller 14 but is rather an integral part of it. In other words, the impeller 14, blades 16 and shroud 18 are initially part of a single large piece of metal. Using various techniques, parts of the single piece of metal are slowly removed to form the blades and the shroud.

Various manufacturing processes are available for manufacturing the impeller and turbine blades, yet nevertheless the multitude of such blades requires a substantial expenditure of resources and time, which affect the rate of production and cost of the final machine. One such method is Electric Discharge Machining (EDM). EDM is a manufacturing process whereby a wanted shape of an object, called workpiece, is obtained using electrical discharges (sparks). The material removal from the workpiece occurs by a series of rapidly recurring current discharges between two electrodes, separated by a dielectric liquid and subject to an electric voltage. One of the electrodes is called tool-electrode and is sometimes simply referred to as 'tool' or 'electrode', whereas the other is called workpiece-electrode, commonly abbreviated as 'workpiece'. The tool-electrode is moved by the machine around the workpiece, based on the three-axial movement.

When the distance between the two electrodes is reduced, the intensity of the electric field in the volume between the electrodes is expected to become larger than the strength of the dielectric (at least in some point(s)) and therefore the dielectric breaks allowing some current to flow between the two electrodes. This phenomenon is the same as the breakdown of a capacitor (condenser). A collateral effect of this passage of current is that material is removed from both the electrodes.

Once the current flow stops, new liquid dielectric should be conveyed into the inter-electrode volume enabling the removed electrode material solid particles (debris) to be carried away and the insulating proprieties of the dielectric to be restored. This addition of new liquid dielectric in the inter-electrode volume is commonly referred to as flushing. Also, after a current flow, a difference of potential between the two electrodes is restored as it was before the breakdown, so that a new liquid dielectric breakdown can occur.

A second method is Electro Chemical Machining (ECM), which is a method of removing metal by an electrochemical process. ECM is normally used for mass production and is used for working hard materials or materials that are difficult to machine using conventional methods. Its use is limited to electrically conductive materials; however, this includes all metals. ECM can cut small, intricate contours or cavities in extremely hard steel and exotic metals such as titanium, hastelloy, kovar, inconel and carbide.

ECM passes a high current between an electrode and the workpiece, through an electrolyte material removal process having a negatively charged electrode (cathode), a conductive fluid (electrolyte), and a conductive workpiece (anode). The ECM cutting tool is guided along the desired path very close to the work but it does not touch the piece. Unlike EDM however, no sparks are created. High metal removal rates are possible with ECM, along with no thermal or mechanical stresses being transferred to the part, and mirror surface finishes are possible.

The process schematic is such that a cathode (tool) is advanced into an anode (workpiece). The pressurized electrolyte is injected at a set temperature to the area being cut. The feed rate is the exact same rate as the rate of liquefaction of the material. The area in between the tool and the workpiece varies within 0.003 in and 0.030 in.

The EDM and ECM are traditionally used for making the blades in the turbines and compressors. The blades are formed by removing excessive material from an original workpiece, which is a solid piece of metal having no blades. The EDM or ECM electrode carves the desired blades in the solid piece of metal for forming the blades. These blades are typically solid because they are made of a superalloy metal, to resist to the extreme conditions inside the turbine or compressor. However, a limitation that affects one or both EDM and ECM methods is the wear of the electrode used for removing the excessive material. As discussed above, while a current is applied between the electrode of the tool and the workpiece that is desired to be machined, the electric discharge removes material not only from the workpiece but also from the electrode of the tool. Thus, as the electrode is removing more and more material from the workpiece to create the blade, a length of the electrode becomes shorter. The shorter electrode would not be able to remove the desired amount of material from the workpiece for creating the blades.

This shortcoming of the EDM and ECM methods is illustrated by FIG. 5, which shows a theoretical pocket 20, i.e., a desired volume to be removed from the workpiece, and the real pocket 22 that is removed by the above noted methods due to the wear of the electrode or other factors. For forming a single blade, a few pockets around the blade have to be removed. A pocket is a volume of material to be removed in one pass of the tool.

However, for obtaining an accurate blade, it is necessary to compensate the reduction in size of the electrode. One existing method is to move the working electrode from the blade to a fixed location (i.e., a probe on the machine) and to measure the length of the electrode at the fixed location. After measuring the length and determining that the electrode is shorter than it is supposed to be, the operator may adjust the length of the electrode and restart the processing of the blade. Although this method may ensure a proper length of the electrode, the time involved for moving the electrode to the fixed location and measuring and adjusting the electrode is considerable, sometimes up to 40% of the cycle time, which is undesirable. Another approach is to estimate the length of the remaining electrode based on experience. However, this approach is prone to fail when the geometry of the blade is complicated and/or new.

Another approach is described in Chen et al., U.S. Patent Application Publication No. 2006/0138092, the entire content of which is incorporated by reference. Chen et al. discloses that a flat 2D path is selected for each pocket (see Chen's FIG. 3) and each pocket is compensated with a same amount R as shown in Chen's FIG. 6 and explained in paragraphs [0028] to [0036]. However, the method of Chen et al. is not appropriate for a 3D impeller (which is shown in FIGS. 3 and 4) for a couple of reasons.

First, the above discussed methods are limited by the three axial movement of the electrode and blades having complicated geometries as shown in FIGS. 3 and 4 cannot be achieved with this kind of movement.

Second, the complex blades shown in FIGS. 3 and 4 require pockets that are not necessary plane, which cannot be handled by the exiting methods. Third, the existing methods use a same compensation step for all pockets ignoring the change in conditions from pocket to pocket and also the change in other parameters.

Accordingly, it would be desirable to provide systems and methods that avoid the afore-described problems and drawbacks as well as others understood by those skilled in the art after consideration of the subject matter disclosed below.

BRIEF SUMMARY OF THE INVENTION

According to one exemplary embodiment, there is a method for compensating a wear of an electrode that machines a workpiece. The method includes selecting a current pocket from plural pockets of the workpiece; updating a wear compensation to be applied to the electrode for the current pocket based on a wear compensation of a previous pocket, wherein the previous pocket is adjacent to the current pocket; and applying the updated wear compensation to the electrode for machining the current pocket.

According to another exemplary embodiment, there is a system for compensating a wear of an electrode that machines a workpiece. The system includes a spindle configured to rotate around an axis and to receive an electrode; a processor configured to control a movement of the spindle and also configured to select a current pocket from plural pockets of the workpiece, update a wear compensation to be applied to the electrode for the current pocket based on a wear compensation of a previous pocket, wherein the previous pocket is adjacent to the current pocket, and apply the updated wear compensation to the electrode for machining the current pocket.

According to still another exemplary embodiment, there is a computer readable medium including computer executable instructions, wherein the instructions, when executed, implement a method for compensating a wear of an electrode that machines a workpiece, the method including providing a system comprising distinct software modules, wherein the distinct software modules comprise an updating wear compensation module; selecting a current pocket from plural pockets of the workpiece; updating a wear compensation to be applied to the electrode for the current pocket based on a wear compensation of a previous pocket, wherein the previous pocket is adjacent to the current pocket; and applying the updated wear compensation to the electrode for machining the current pocket.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of turbine blades. However, the embodiments to be discussed next are not limited to these systems, but may be applied to other systems that require the removal of material at various angles and positions for forming a desired shape with a desired size.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Electrochemical discharge machining (ECDM) is an advanced hybrid machining process including the techniques of ECM and EDM. The process is capable of removing a variety of conductive materials, especially super alloys.

Figure 1:
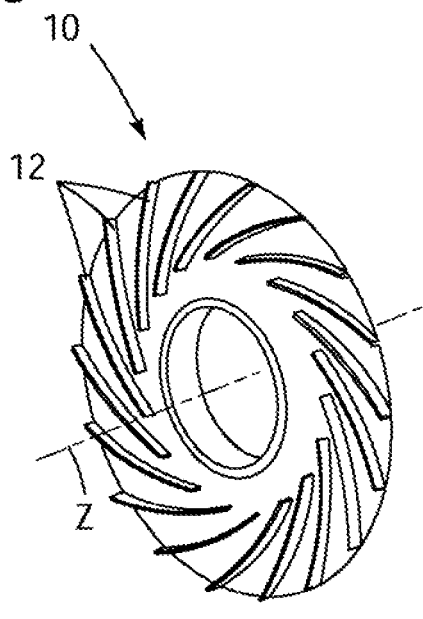
FIG. 1 is a schematic diagram of an open impeller having 2D blades.
Figure 2:
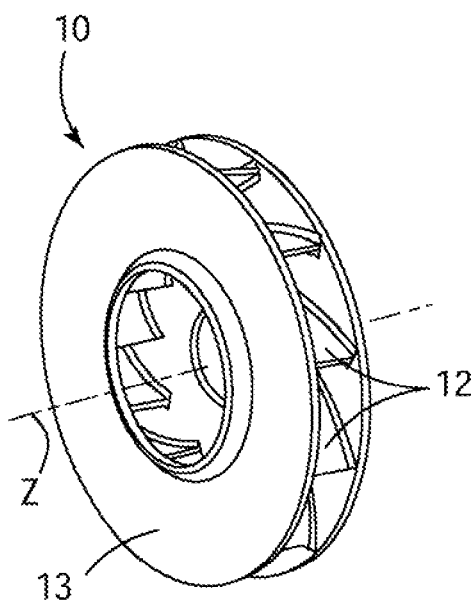
FIG. 2 is a schematic diagram of a closed impeller having 2D blades.
Figure 3:
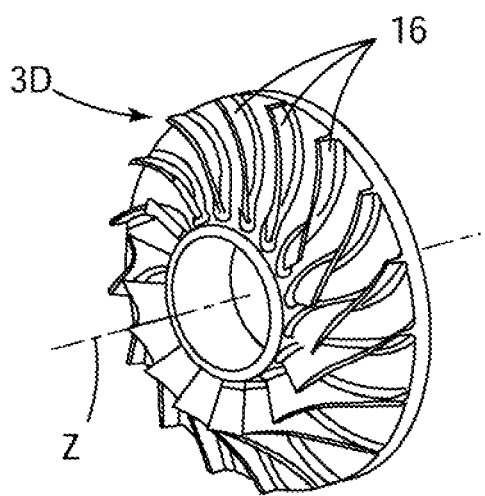
FIG. 3 is a schematic diagram of an open impeller having 3D blades.
Figure 4:
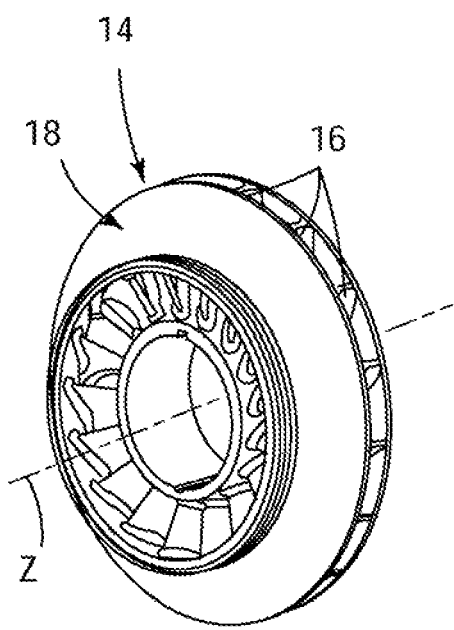
FIG. 4 is a schematic diagram of a closed impeller having 3D blades.
Figure 5:
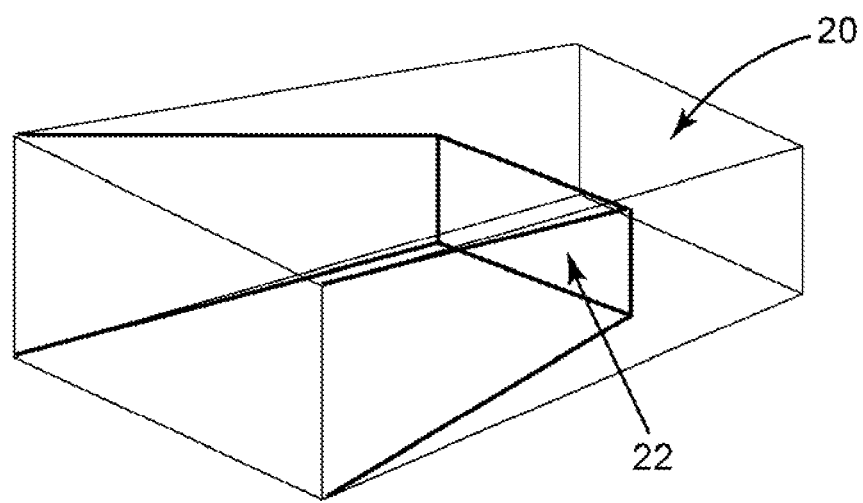
FIG. 5 is a schematic diagram illustrating a gap between a real pocket and an ideal pocket.
Figure 6:
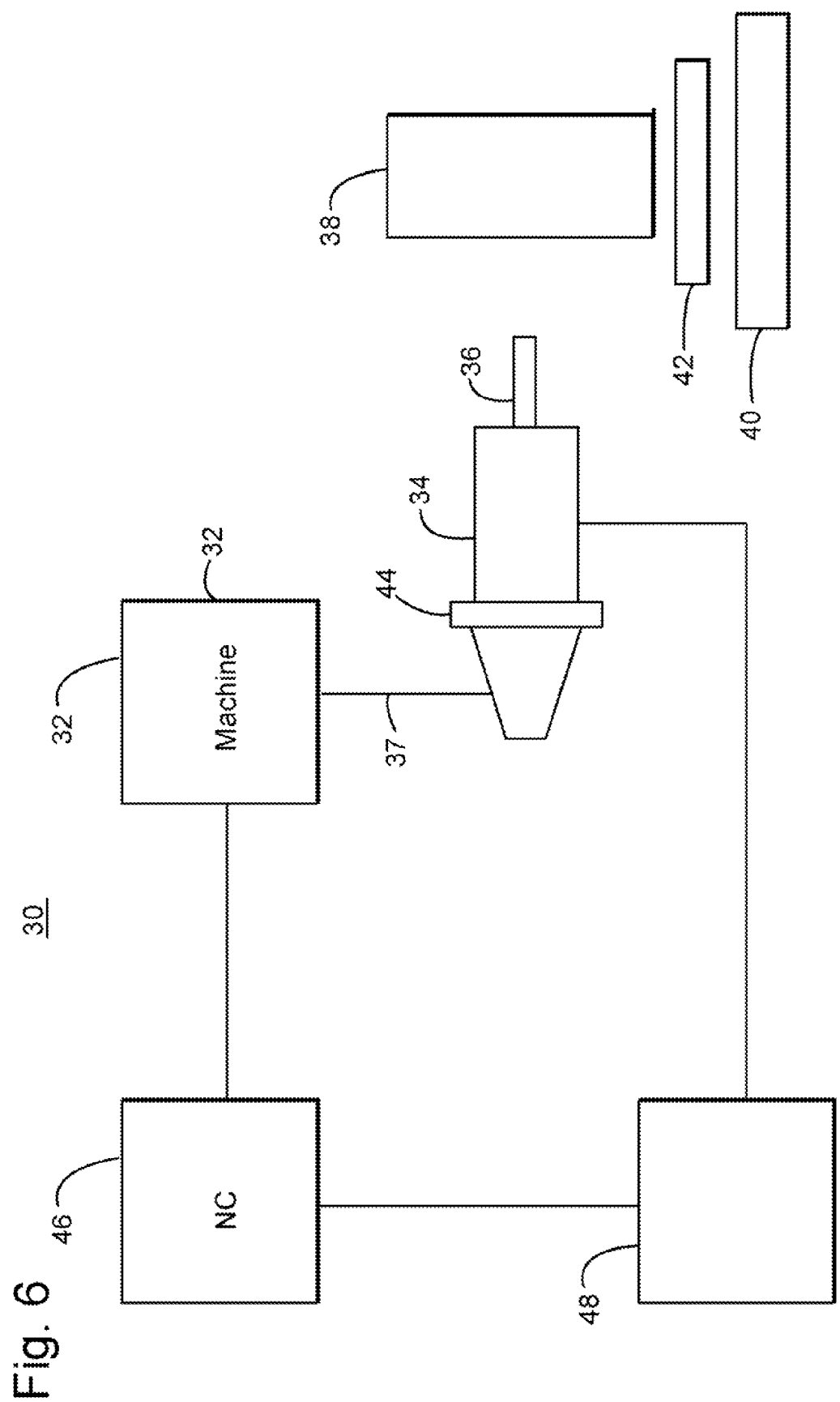
FIG. 6 is a schematic diagram of a machine tool according to an exemplary embodiment.

Two examples of ECDM are found in U.S. Pat. Nos. 6,562,227 and 6,787,728, which are incorporated herein by reference. As shown in FIG. 6, such an ECDM system 30 includes a machine 32 that is configured to rotate a spindle 34 that holds an electrode 36. A link 37 between machine 32 and spindle 34 may include any known mechanism in the art as long as the link 37 and/or machine 32 allows electrode 36 to move along three different axes and to rotate about two different axes. In one application, the spindle is configured to move along only one axis, two axes, and so on. The electrode 36 may be moved towards workpiece 38 for producing the desired shape. Workpiece 38 may be supported by a table 40. Table 40 may be configured to rotate or displace the workpiece. An insulation interface 42 may be provided between workpiece 38 and table 40 for absorbing vibrations of the workpiece 38. Another insulation interface 44 may be provided between spindle 34 and link 37. Machine 32 may be controlled by a numerical controller 46 for directing electrode 36 along a desired path. A power source 48 provides the necessary electrical power to the numerical controller 46, spindle 34 and machine 32. Other components that are know in the art may be present, as for example, a device for flushing the removed material, a high pressure pump, a ventilator, suction system, a cell, an electrolyte, another electrode, etc. Electrode 36 is able to move not only on X, Y, and Z directions, but also to rotate along two different axes (for example X and Y) by angles theta and phi, respectively.

In this way, electrode 36 is able to provide up to five-axial movement, which makes this machine appropriate for making detailed and complicated geometries in the workpiece for forming the blades of the turbomachines. Power source 48 provides enough power so that discharges at the tip of the electrode 36 occur. When a voltage is applied to the electrode 36, discharges occur at the tip of the electrode. Machining takes place on the workpiece 38 surface kept near the electrode 36 tip where discharges occur.

While a pocket (amount of metal to be removed from the workpiece during a pass of the machine) has been defined in the ECM and EDM methods as being a small plane which is removed by the tip of the machine in one pass, in the case of ECDM the pocket may be a single line, a small plane, or other 3D shapes that may be selected by the operator of the machine depending on the geometry of the desired blade.

Figure 7:
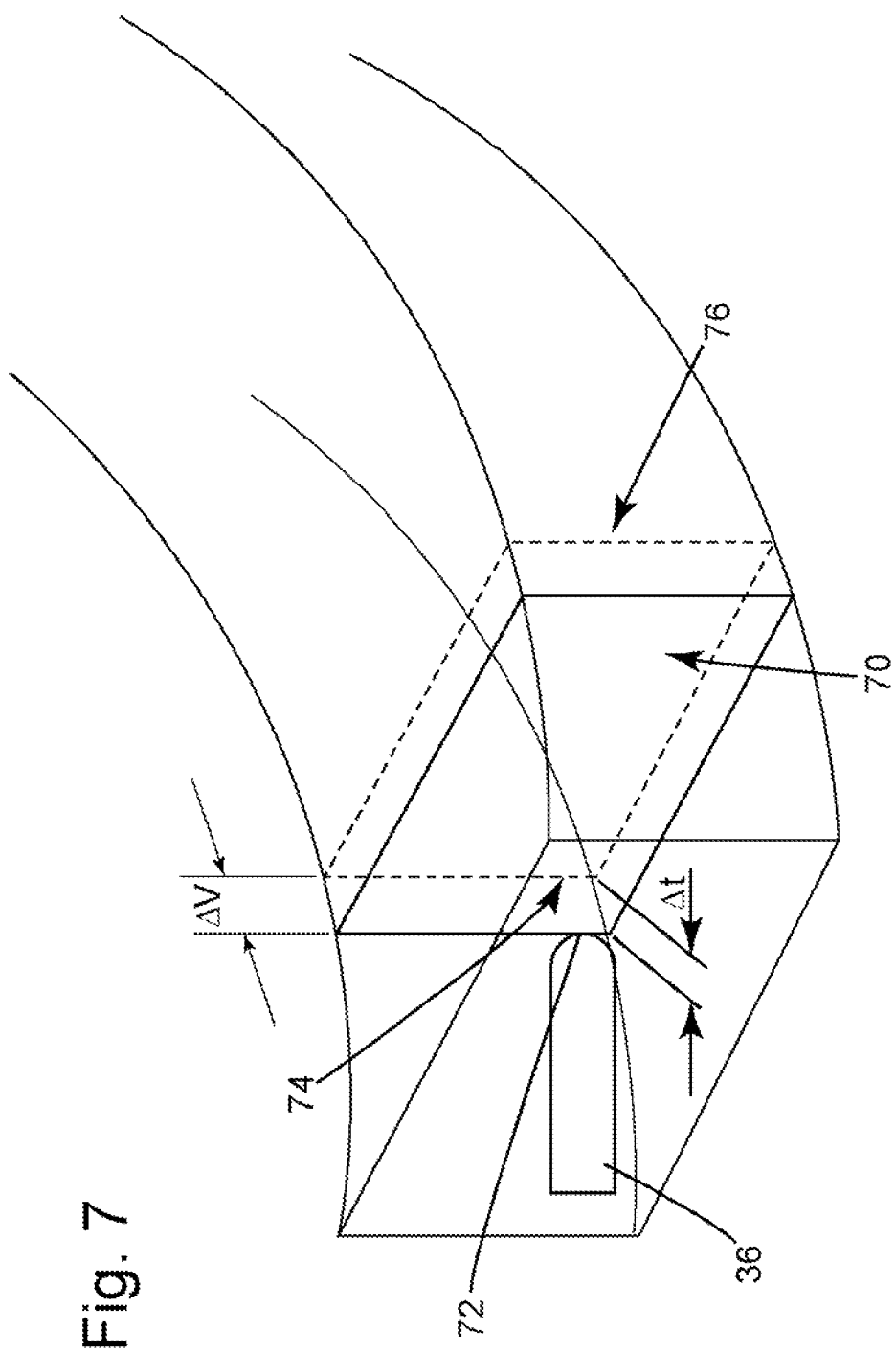
FIG. 7 is a schematic diagram illustrating material removal with an electrode.

An example of a 3D pocket 70 is shown in FIG. 7 in which an actual start point 72 for removing pocket 70 is shown as being at a certain distance from a theoretical start point 74, which is the desired starting point. Thus, the electrode 36 tip starts removing material from pocket 70 instead of the desired pocket 76, which is called the theoretical pocket as this pocket is envisioned to be removed by the programmer of the machine. However, because of the uncompensated tool wear, pocket 70 is removed instead of pocket 76. According to an exemplary embodiment, the pocket may be defined to be a single line or a 3D surface, i.e., not only a 2D plane.

Figure 8:
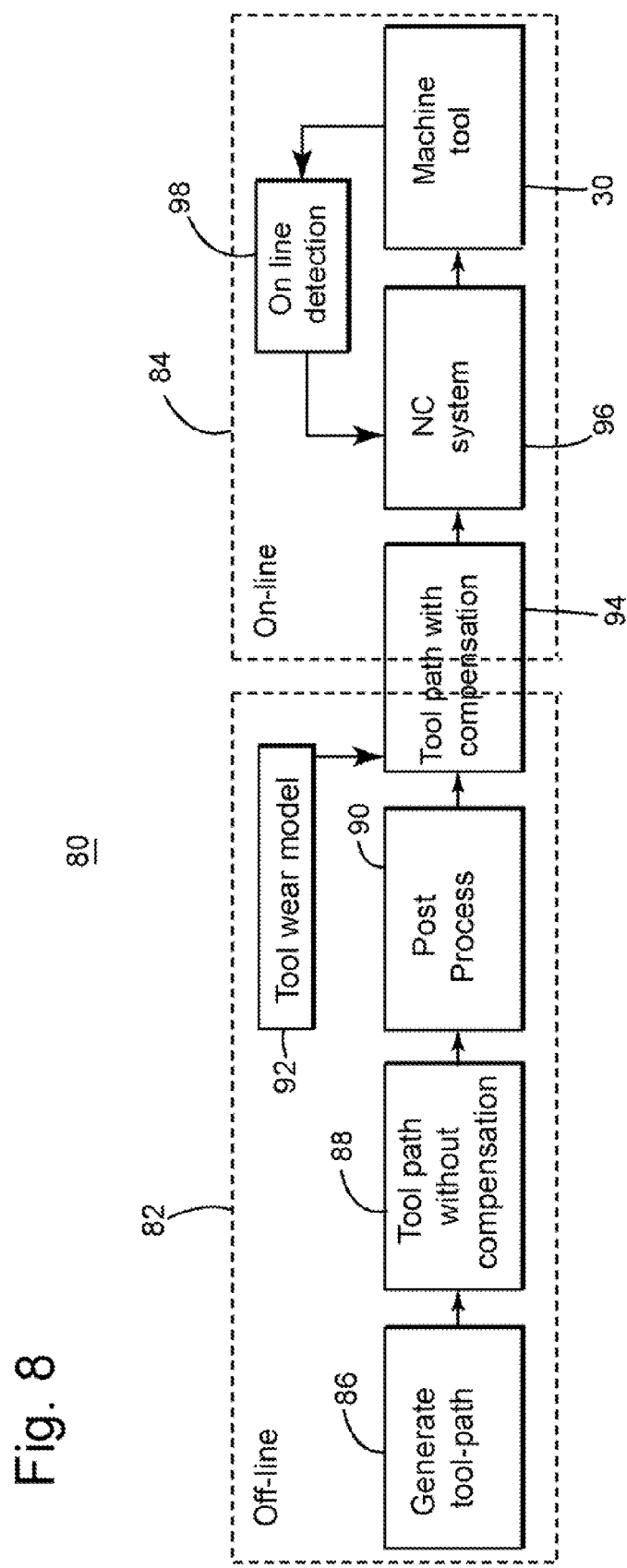
FIG. 8 is a schematic diagram of a module for determining wear compensation of the electrode according to an exemplary embodiment.

According to an exemplary embodiment, a tool wear compensation process 80 may be implemented as two modules, an off-line module and an online module. FIG. 8 shows the off-line module 82, which corresponds to a rough compensation, and the online module 84, which corresponds to a fine compensation. The off-line module 82 may include a tool path generating module 86 in which software (for example CAD/CAM) generates a tool path (theoretical tool path) for a desired blade design. The tool path provides the coordinates to be followed by the machine tool for removing material from the workpiece for forming a desired final product, e.g., a blade. The tool path may include information related to the final shape of the blade, the number of pockets to be used for achieving the blade, the exact positions of the electrode and/or tool that would manufacture the blade, etc. The tool path information is then transmitted via an appropriate interface 88 to a processing element 90 for applying a post process, e.g., translating an output of the generate tool-path 86 to machine language. It is noted that the tool path calculated by element 86 does not include a compensation for the wear of the electrode, i.e., it is calculated for an ideal electrode that does not undergo any wear.

Based on a tool wear model to be discussed later, a tool wear model module 92 starts from various information for determining the tool wear distribution along the tool path generated by module 86. This information is applied to the tool path determined by module 86 and the real tool path is calculated at this stage. The compensated (real) tool path is provided in step 94 to the on-line module 84. However, according to an exemplary embodiment, tool 30 may have only the off-line module 82 or both the off-line module 82 and the online module 84.

According to an exemplary embodiment, the online module 84 may be implemented in a corresponding circuit or in a same circuit as the off-line module 82. The online module 84 sends to a numerically controlled (NC) system 96 the compensated tool path and the NC system 96 applies the tool path to the machine tool 30. The machine tool 30 implements the tool path received from the NC system 96 and removes pocket after pocket. After finishing a pocket, an online detection system 98 may be used to determine the length of the electrode of the machine tool 30. Based on the measurement performed by the online detection system 98, the NC system 96 may further adjust the tool path or the position of the spindle 34 of the machine tool 30 to compensate for the wear of the electrode. It is noted that by adjusting the position of the spindle 34 instead of recalculating the tool path, the software used for obtaining the blade may be easily distributed to different machines having different geometries, i.e., the software is portable.

The online detection system 98 may include, for example, a laser calibration system for determining the length of the electrode or a physical contact calibration system, or may include other devices as would be recognized by those skilled in the art. In one application, not only the length of the electrode is determined but also a diameter of the electrode.

Figure 9:
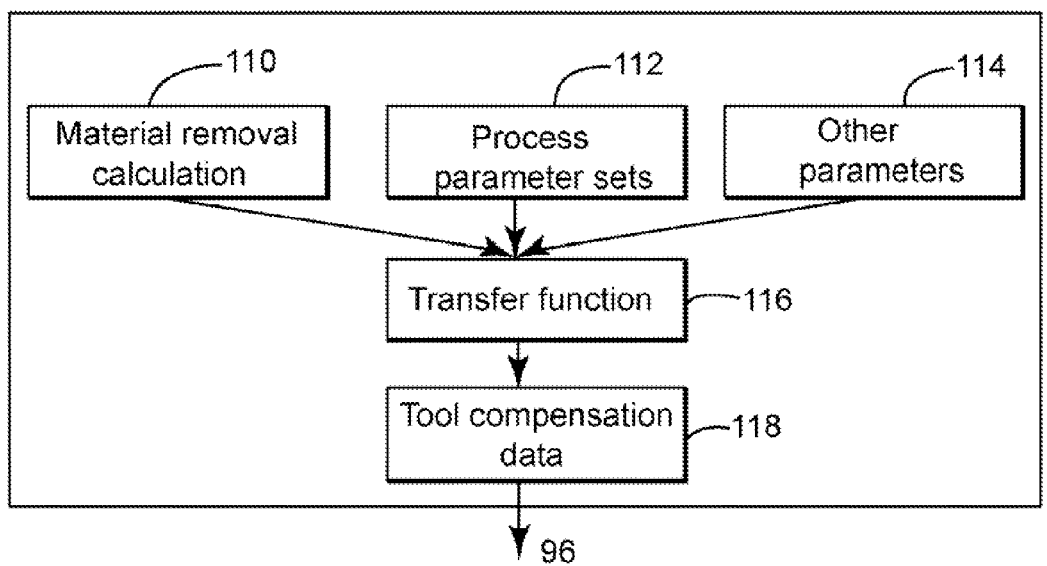
FIG. 9 is a schematic diagram of a tool wear model module according to an exemplary embodiment.

With regard to the tool wear model module 92, FIG. 9 shows possible modules that are included for determining tool compensating data. More specifically, FIG. 9 shows that the tool wear model module 92 includes a material removal calculation module 110, a process parameters sets module 112, and another parameters module 120.

These modules may be implemented as dedicated circuitry, software or a combination thereof. The material removal calculation module 110 may include between 5 and 15 parameters, for example, electrode shape, electrode material, workpiece material, pocket shape, which are either stored in a memory of the module or actively determined/measured by the system in order to calculate a volume of the material removed from the workpiece by the machine tool.

The process parameter sets module 112 stores parameters related to the machine tool, e.g., depth of cut, cutting speed, rounds per minute, etc. and the other parameters module 114 stores parameters related to other aspects of the machining process, e.g., flushing flow and pressure, voltage and amperage, current waveform, pulse, etc.

Based on the parameters and other data received from modules 110, 112, and 114, a transfer function module 116 calculates a tool wear D along a certain axis, for example, a Z axis. The tool wear is given by a transfer function f, which may be expressed as $D=f(Vmm, P\_on, P\_off, Ipeak, Pflushing, \ldots)$, where Vmm is the volume of removed material, P_on is the fraction of the unit of time in which the current is on, P_off is the fraction of the unit of time in which the current is off, Ipeak is the peak current applied to electrode 36, Pflushing is the flushing pressure and flow, etc. One or more of the parameters available from modules 112 and 114 may be used in the transfer function.

The result D of the transfer function f calculated by module 116 is provided to a tool compensation data module 118, which may provide the information directly to the NC system 96 for applying the results of the transfer function to the tool path. According to an exemplary embodiment, the result of the transfer function may be distributed averagely along the tool path. According to still another exemplary embodiment, a different wear compensation is applied for each pocket, as will be discussed later.

According to another exemplary embodiment, the wear compensation of the electrode is calculated/updated for each pocket as the tool machine processes a blade or other element. A method for calculating/updating the wear compensation for a current pocket may take into consideration (i) the wear compensation applied to a previous pocket or pockets, and/or (ii) measured/determined parameters of the electrode prior to machining the current pocket. The measured/determined parameters include but are not limited to a geometry of the electrode (i.e., length, diameter, etc.).

According to an exemplary embodiment, the process starts applying a predetermined wear compensation to a first pocket. The predetermined wear is generated by the tool wear model. This predetermined wear compensation may be an amount determined based on experience. The above mentioned parameters (geometry of the electrode) may be measured/determined while removing the first pocket and/or at the end of the first pocket and a new (actual) wear compensation is evaluated at the end of the first pocket to be applied to a next pocket. The condition in each pocket may be different due to a flushing condition for that pocket, a geometry of the pocket, a geometry of the electrode, tool wear, and other. The on-line detection system 84 is used to update the conditions of the process and reapply the new wear compensation to the next pocket.

Figure 10:
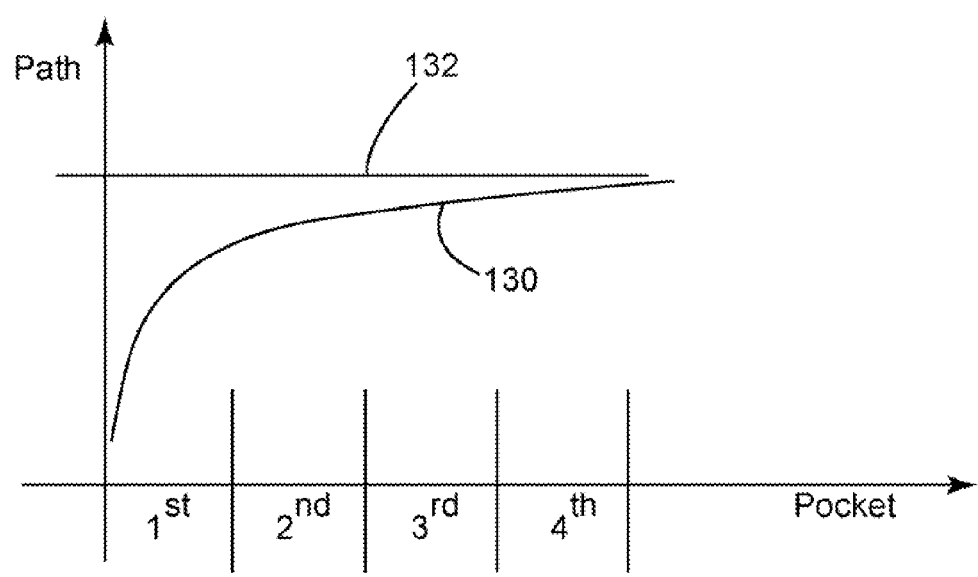
FIG. 10 is a schematic diagram of a decreasing gap between a real tool path and an ideal tool path according to an exemplary embodiment.

As a result of this reliance of the wear compensation for a current pocket on previous pocket(s), a gap between the real path 130 and the theoretical path 132 improves as the machine tool advances, as shown in FIG. 10. According to an exemplary embodiment, the calculation of the wear compensation for each current pocket takes into consideration only parameters related to the previous pocket.

Figure 11:
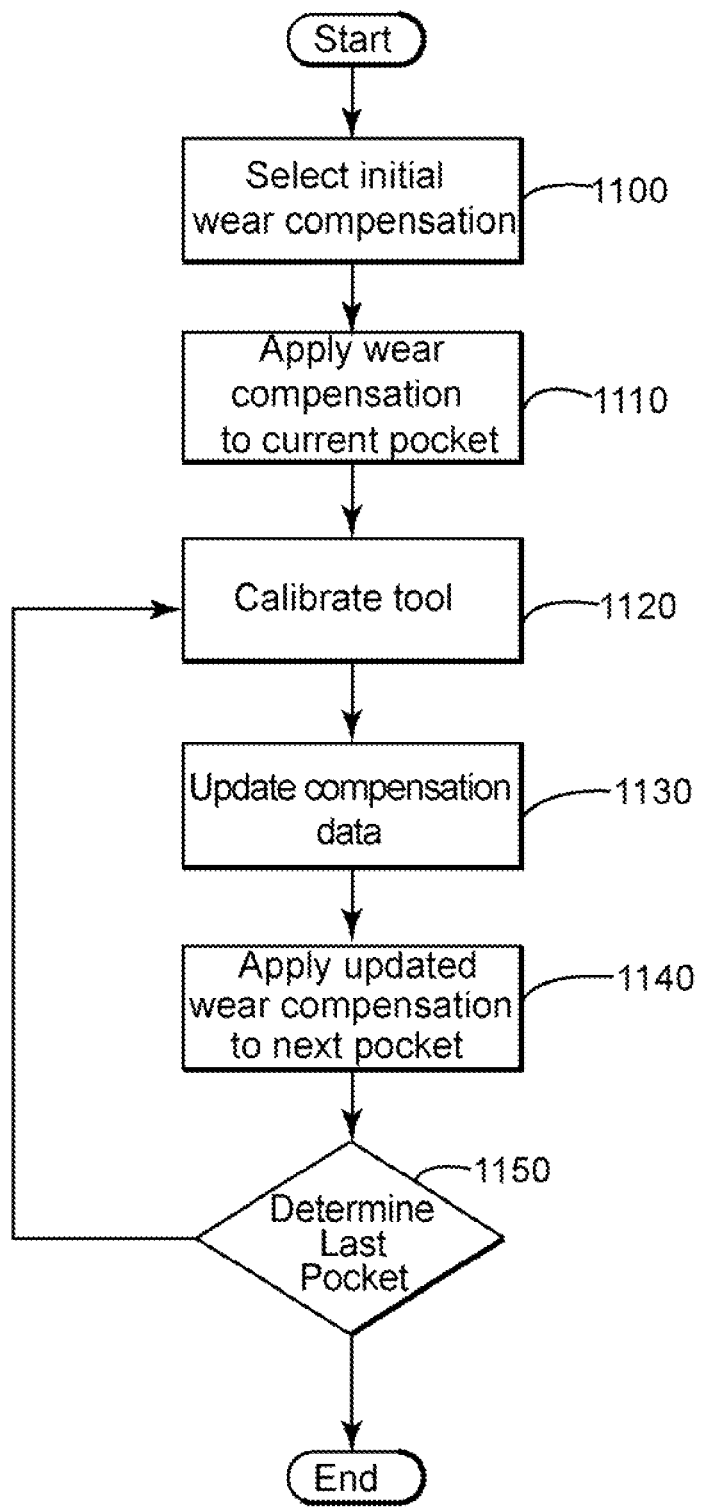
FIG. 11 is a flow chart illustrating steps performed by the machine tool for removing material from a workpiece according to an exemplary embodiment.

The steps of a method for calculating/determining the wear compensation for the machine tool as discussed above are exemplified with regard to FIG. 11. In step 1100, based on data received from the off-line module 82, a wear compensation is selected for a current pocket, which may be a first pocket. In other words, the machine tool selects the wear compensation based on data stored in the memory of the machine. This data may include, among others, material parameters (parameters characterizing the material to be removed to form the blades), electrode parameters as size, chemical composition, etc., electric parameters of the material to be removed, the electrode, and the electrolyte, a 3D geometry of the blade, etc.

This data is provided to the transfer function as input and the transfer function module 116 determines the wear compensation to be applied to the current pocket in step 1110. After the current pocket has been removed, the electrode of the machine tool is calibrated in step 1120. This calibration may be performed online, off-line or may not be performed at all. Data from the current pocket is collected and provided to the transfer function module 116 to calculate/update in step 1130 the wear compensation for the next pocket.

In one application, the length of the electrode at the beginning of the previous pocket is compared to the length of the electrode at the end of the previous pocket to determine a volume of consumed material from the electrode. Also, the machine may calculate the tool path length for the previous pocket and then it may evaluate the tool wear compensation to be applied to the current pocket by dividing the consumed material (e.g., millimeters of graphite) of the electrode with the real length of the tool path in the previous pocket. According to this exemplary embodiment, the machine does not use a constant rate of wear of the electrode for all the pockets, which may be available from the manufacturer of the electrode but rather calculates for each current pocket the amount of wear compensation. In this way, local factors specifics for each machine, e.g., flushing rate, flushing pressure, ambient temperature, etc., which also influence the wear rate of the electrode, are taken into account when calculating the new wear compensation of the electrode. In other words, by calculating for a current pocket the consumed material and the path length, most of the parameters that influence the ECDM process are factored in. The change of one or more of these parameters during the ECDM process is reflected in the material removed during the current pocket. These changes are applied to the next pocket due to the calculations discussed above. Thus, according to an exemplary embodiment, the machine 32 is configured to continuously monitor the ambient and reflect any change in the manufacturing of the next pocket by adjusting the wear compensation of the next pocket.

For example, while a traditional machine uses a same wear compensation for each pocket as the wear rate of the electrode is constant, the present exemplary embodiment advantageously calculates the wear rate of the same electrode pocket after pocket, consequently applying a different wear compensation to the same electrode pocket after pocket assuming that one or more parameters (e.g. temperature) of the process are changing. Other data may be provided to the transfer function module 116 for calculating/updating the wear compensation of the next pocket, as for example, pressure of the ambient, etc. In one application, if a wear compensation of a current pocket differs from a wear compensation of a next pocket by more than a certain threshold value, the machine may be configured to reduce a size of the next pocket such that the difference between the wear compensation between two successive pockets is maintained below the threshold value. The threshold value depends on the machine used, the electrode, the material to be removed from the workpiece, etc.

Having the wear compensation data calculated/determined in step 1130, this data is applied in step 1140 to the machine tool 30 when machining the next pocket. Once the next pocket is finished, the machine determines in step 1150 whether other pockets have to be processed. If the result is negative, the process ends. If the result is positive, the process advances to step 1120 to process the next pocket and data from the previous pocket is applied to the current pocket for updating the wear compensation as discussed above until all the pockets are processed.

One advantage of this method is that each pocket may have a different wear compensation so that changing characteristics of the material and/or the environment are taken into consideration. Also, the gap between the real tool path and the theoretical tool path is reduced as the process progresses.

Figure 12:
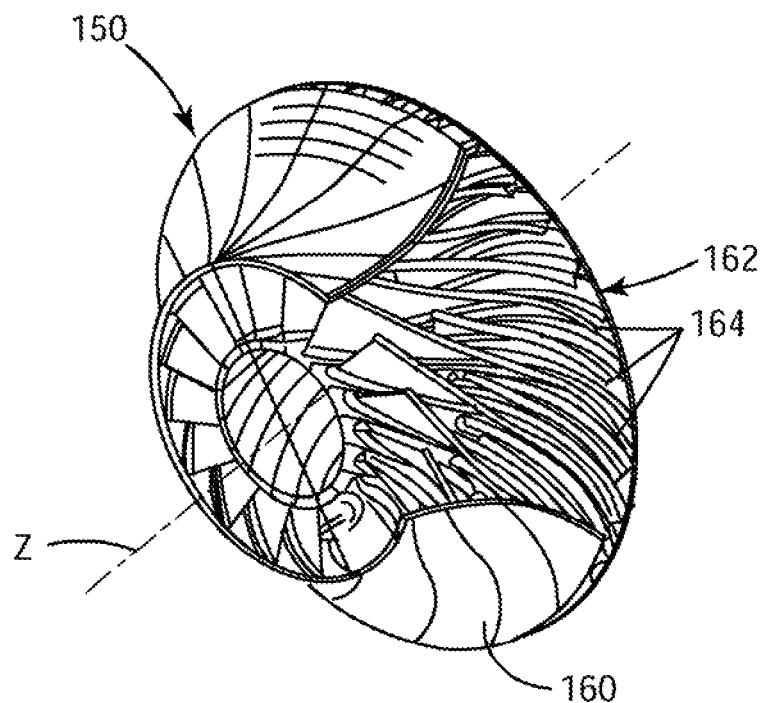
FIG. 12 is a schematic diagram of a closed impeller having a 3D geometry.
Figure 13:
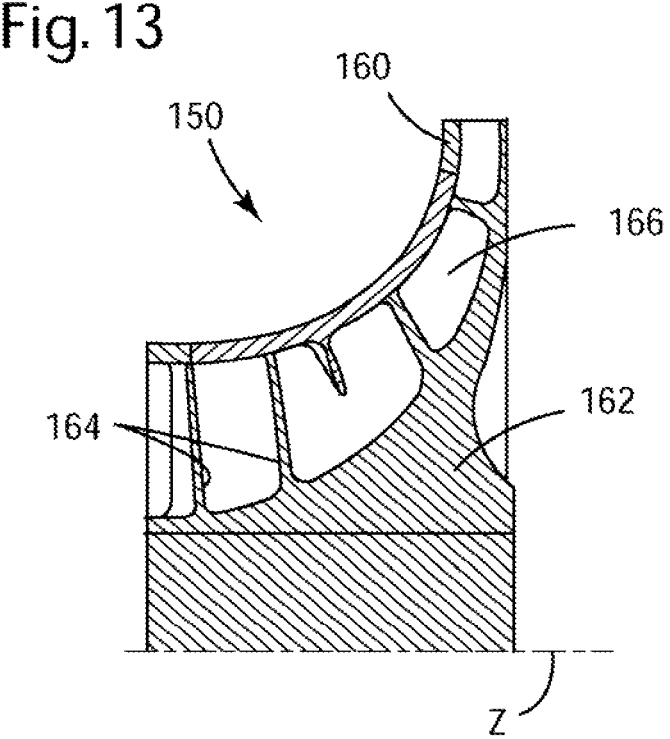
FIG. 13 is a cross section of the closed impeller of FIG. 12.

Still another advantage of one or more embodiments is the possibility to produce complicated structures as shown, for example, in FIGS. 12 and 13. FIG. 12 shows an impeller 150 having a shroud 160 and a root 162 that sandwich blades 164. FIG. 13 is a cross-sectional view of the impeller 150 of FIG. 12 and shows cavities 166 that are formed between the blades 164. It is noted that a conventional three axis machine tool cannot remove the material for forming cavities 166 as shown in FIG. 13.

Another advantage of the method described above is that under changing conditions in which the machine operates, the process changes accordingly and adapts to the new conditions by providing an adaptable wear compensation. One example is the reductions in size of the pockets to quickly adapt to the actual environmental conditions. These advantages may not be achieved by the traditional machines as those machines are using fixed wear rates of the electrodes and do not take into consideration the influence of the ambient on the ECDM process.

Figure 14:
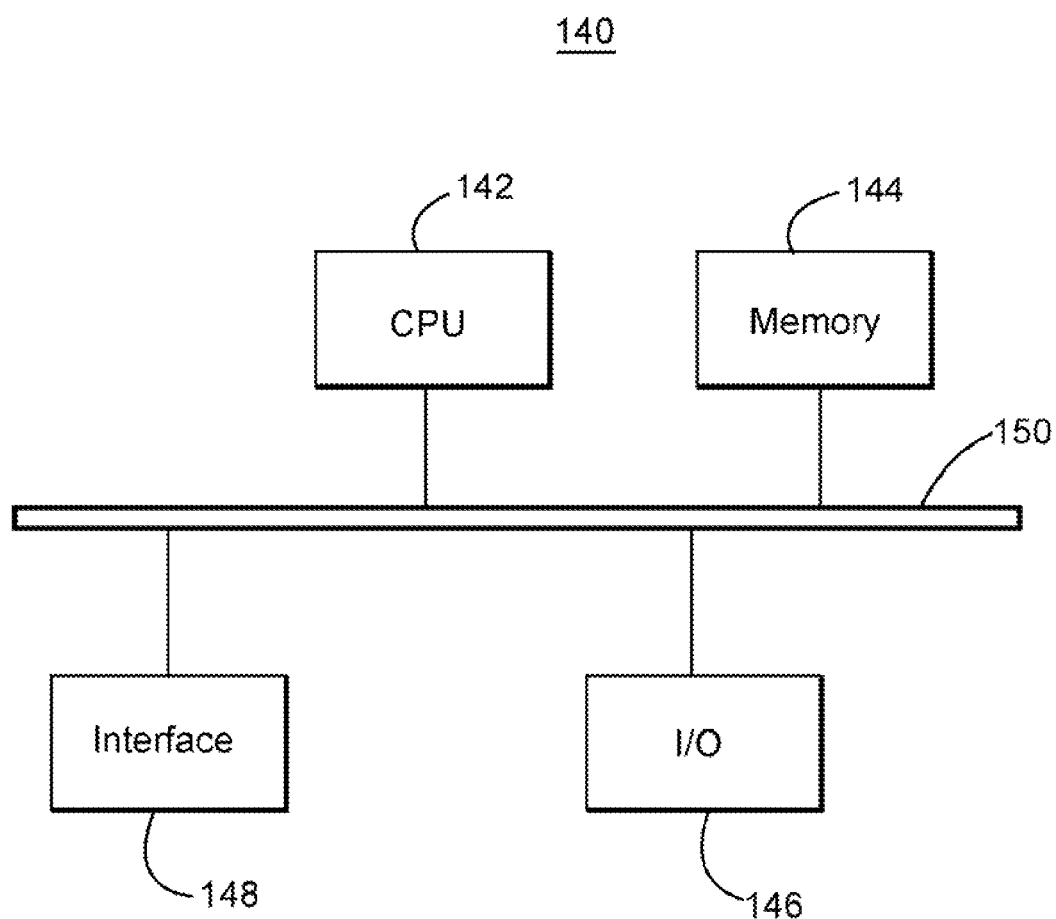
FIG. 14 is a schematic diagram of circuitry that determine a control path and control the machine tool according to an exemplary embodiment.

The various modules shown in the figures may be implemented, for example, in circuitry 140 as shown in FIG. 14. Circuitry 140 may be part of machine 32 or part of NC system 46 or may be distributed at both of them. The circuitry 140 may include a processor 142, memory 144, input/output interface 146, and/or an interface 148 for connecting to, for example, a network. All these elements may be connected to a bus 150. Circuitry 140 may be provided on the machine tool and may be linked to various sensors, e.g., pressure, temperature, etc. for measuring corresponding parameters.

Figure 15:
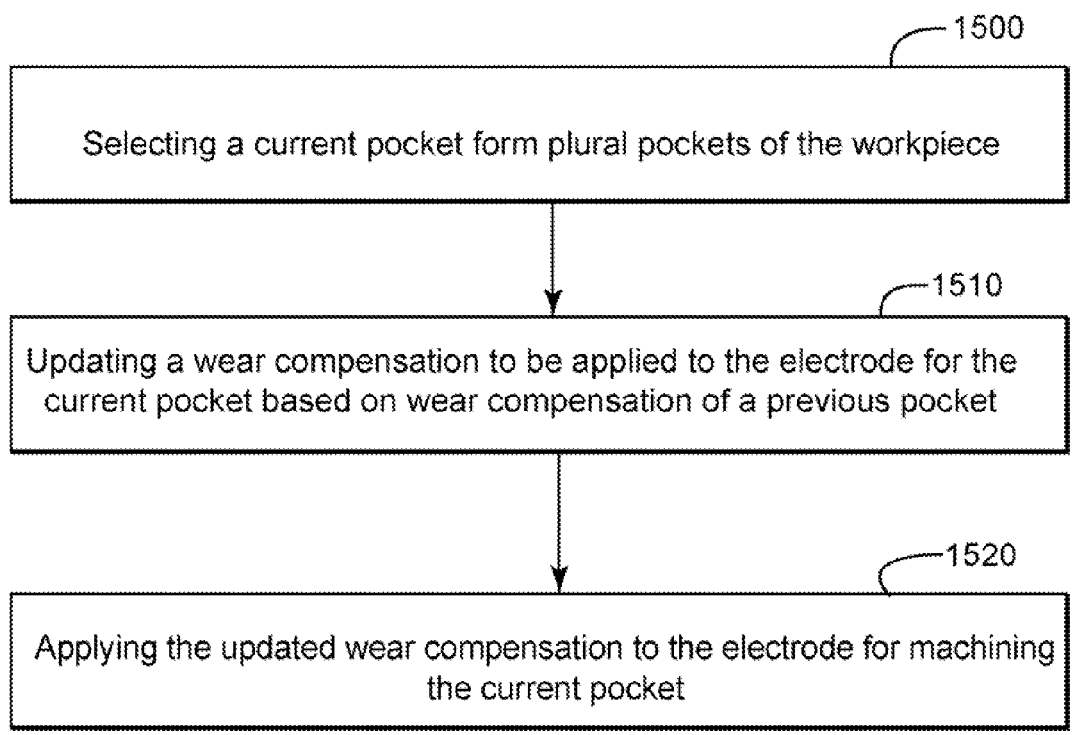
FIG. 15 is a flow chart illustrating steps performed by the machine tool according to an exemplary embodiment.

According to an exemplary embodiment, illustrated in FIG. 15, there is a method for compensating a wear of an electrode that machines a workpiece. The method includes a step 1500 of selecting a current pocket from plural pockets of the workpiece, a step 1510 of updating a wear compensation to be applied to the electrode for the current pocket based on wear compensation of a previous pocket and/or other data, wherein the previous pocket is adjacent to the current pocket, and a step 1520 of applying the updated wear compensation to the electrode for machining the current pocket.

Based on the above discussed method, a system for compensating a wear of an electrode that machines a workpiece may include a spindle configured to rotate around an axis and to receive an electrode and a processor. The processor is configured to control a movement of the spindle and is also configured to select a current pocket from plural pockets of the workpiece, update a wear compensation to be applied to the electrode for the current pocket based on a wear compensation of a previous pocket, wherein the previous pocket is adjacent to the current pocket, and apply the updated wear compensation to the electrode for machining the current pocket.

The processor may also be configured to determine a length of a tool path of the electrode for machining the previous pocket, determine an amount of material consumed from the electrode after machining the previous pocket, and divide the amount of material consumed after machining the previous pocket with the length of the tool path for machining the previous pocket for determining the updated wear compensation for the current pocket. Further, the processor may be configured to adjust a size of the current pocket when the updated wear compensation is larger than a predetermined threshold, or to apply a different wear compensation to a first pocket from a second adjacent pocket depending on various parameters of the process, or to apply a predetermined wear compensation to the first pocket of the plural pockets. The system may include a memory configured to store parameters on which the predetermined wear compensation is based. The spindle of the system may be configured to move about from one to five axes such that the electrode carves blades of an impeller from a single piece of metal, or to move the electrode along three axes, and to rotate the electrode about two axes to obtain a five axial machine. The processor may be configured to continuously update each pocket of the plural pockets. The updated wear compensation takes into account one or more of an ambient temperature, a flushing pressure, or an amount of current applied to the electrode.

The disclosed exemplary embodiments provide a system and a method for determining a wear compensation of an electrode that machines a workpiece. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples to disclose the invention, including the best mode, and also to enable any person skilled in the art to practice the invention, including making and using any devices or systems and performing any incorporated methods.

The patentable scope of the invention is defined by the claims, and may include other examples that occur to those skilled in the art. Such other example are intended to be within the scope of the claims if they have structural elements that do not differ from the literal language of the claims, or if they include equivalent structural elements within the literal languages of the claims.

What is claimed is:

1. A method for compensating a wear of an electrode, used in an electric discharge machine, that machines a workpiece with at least one pocket, wherein the pocket is an amount of metal to be removed from the workpiece during a pass of the machine, the method comprising:
    machining a first pocket from plural pockets;
    comparing a length of the electrode at the end of the first pocket to determine a volume of consumed material from the electrode;
    selecting a current pocket, adjacent to the first pocket, to be machined from plural pockets of the workpiece;
    updating a wear compensation to be applied to the electrode for the current pocket based on a wear compensation of a previous pocket; and applying the updated wear compensation to the electrode and machining the current pocket from the plural pockets: wherein the current pocket is a second adjacent pocket.

2. The method of claim 1, wherein the step of updating a wear compensation further comprises:
determining a length of a tool path of the electrode for machining the previous pocket;
determining an amount of material consumed from the electrode after machining the previous pocket; and
dividing the amount of material consumed after machining the previous pocket by the length of the tool path for machining the previous pocket for determining the updated wear compensation for the current pocket.

3. The method of claim 2, further comprising:
adjusting a size of the current pocket when the updated wear compensation is larger than a predetermined threshold.

4. The method of claim 1, further comprising:
applying a wear compensation to a first pocket that is different from a wear compensation to the second adjacent pocket, depending on predetermined parameters.

5. The method of claim 1, further comprising:
applying a predetermined wear compensation to the first pocket of the plural pockets.

6. The method of claim 5, wherein the predetermined wear compensation is based on parameters stored in a memory.

7. The method of claim 1, further comprising:
carving blades of an impeller from a single piece of metal by moving the electrode about from one to five axes.

8. The method of claim 1, wherein the step of updating a wear compensation further comprises:
continuously updating the wear compensation for each pocket of the plural pockets.

9. The method of claim 1, wherein the updated wear compensation accounts for one or more of an ambient temperature, a flushing pressure, or an amount of current applied to the electrode.

10. The method of claim 1, wherein updating a wear compensation for the current pocket takes into consideration measured parameters of the electrode prior to machining the current pocket.

11. The method of claim 10, wherein the measured parameters comprises a geometry of the electrode.

* * * * *